Figure 2:
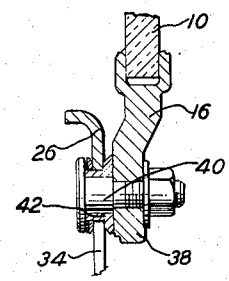

Oct. 15, 1957  J. J. BOGDEN  2,809,827
WINDOW REGULATOR
Filed Oct. 25, 1954  2 Sheets-Sheet 1
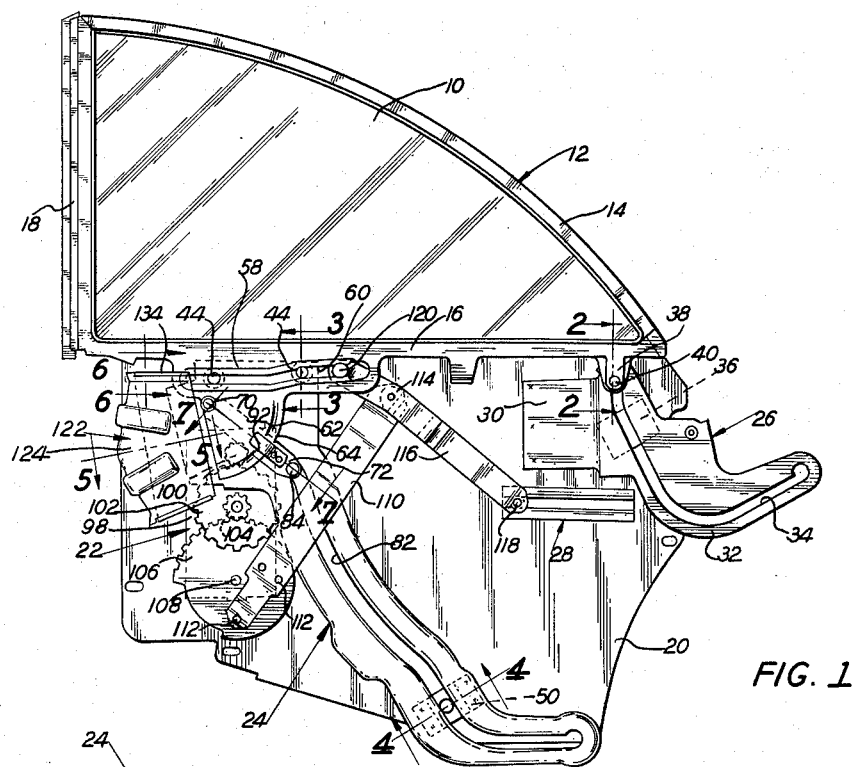
FIG. 1
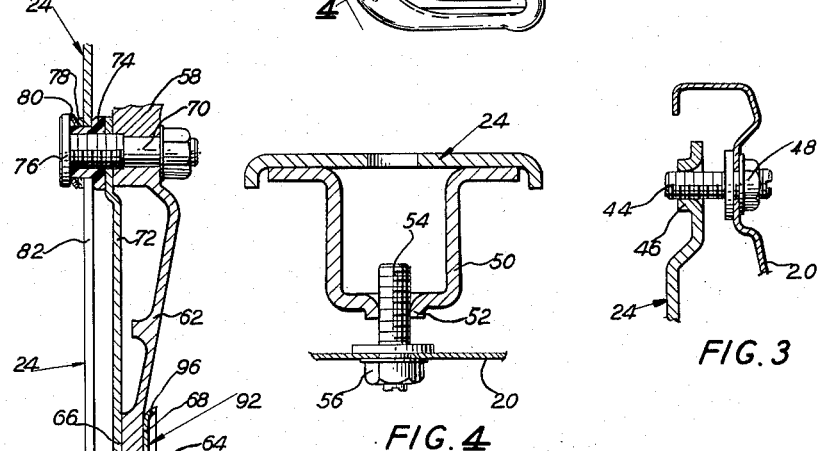
FIG. 7   FIG. 4   FIG. 3
J. J. BOGDEN
INVENTOR.
BY 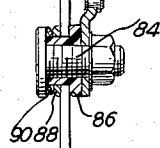
ATTORNEYS Oct. 15, 1957   J. J. BOGDEN   2,809,827
WINDOW REGULATOR
Filed Oct. 25, 1954   2 Sheets-Sheet 2

J. J. BOGDEN
INVENTOR.

BY *E. C. McCall*
*J. R. Faulkner*
*J. H. Oster*

ATTORNEYS

United States Patent Office 2,809,827
Patented Oct. 15, 1957

2,809,827
WINDOW REGULATOR

Joseph J. Bogden, Dearborn, Mich., assignor to Ford Motor Company, Dearborn, Mich., a corporation of Delaware Application October 25, 1954, Serial No. 464,331

8 Claims. (Cl. 268—126)

This invention relates generally to window regulators for motor vehicle windows, and has particular reference to a window regulator adapted to move a vehicle window in a predetermined combined vertical and longitudinal path.

Although motor vehicle windows are usually mounted for vertical sliding movement in vertical guideways or for pivotal swinging movement about a fixed transverse axis, certain installations present clearance problems which make such mounting impractical. For example, in some vehicles the rear quarter windows may require a combined vertical and longitudinal movement to avoid certain vehicle components while lowering the window into the available space. An object of the present invention is to provide window operating and guiding structure which will properly support and guide such a window throughout its movement. The mechanism is particularly designed to provide a smooth and easily operated assembly which keeps the quarter window under precise control at all times and which bodily moves the window rearwardly and downwardly into the window well while at the same time supporting and guiding the window in such manner as to afford lateral stability.

Other objects and advantages of this invention will be made more apparent as this description proceeds, particularly when considered in connection with the accompanying drawings, wherein:

Figure 1 is a side elevational view of a portion of a motor vehicle body incorporating the window regulator mechanism of the present invention.

Figures 2, 3, 4, 5, 6 and 7 are enlarged cross sectional views taken on the planes indicated by the lines 2—2, 3—3, 4—4, 5—5, 6—6 and 7—7 of Figure 1.

Referring now to the drawings, and particularly to Figure 1, the reference character 10 indicates a rear quarter window supported within a window frame 12 formed of interconnected upper and lower frame sections 14 and 16. A weather strip 18 is carried at the forward edge of the window frame for sealing engagement with the adjacent vertically slidable window (not shown) of a convertible or hard top type vehicle body.

The location of other vehicle components and the available space for housing the quarter window 10 within the body requires a combined bodily movement of the window in a downward and rearward path. Movement of the window in this path under the proper control is obtained by the window regulator mechanism shown herein.

Fixedly mounted within the vehicle body is a supporting panel 20 arranged generally vertically. The supporting panel 20 forms a support upon which are mounted the regulator assembly 22, a front guide plate 24, a rear guide plate 26, and an equalizer arm guide 28.

The front and rear guard plates 24 and 26 guide the front and rear portions of the quarter window in a predetermined path as the window is raised or lowered. The rear guide plate 26 comprises a sheet metal bracket having a forward flange 30 spot welded to the supporting panel 20 and a laterally offset flange 32 formed with a guide groove 34 therein. A guide reinforcing bracket 36 supports the offset flange 32 of the rear guide and maintains it in properly spaced relationship with respect to the supporting panel 20.

An integral downwardly depending flange 38 is formed on the rearward portion of the lower frame section 16 of the quarter window frame 12 and carries a stud 40 projecting through the slot 34 in the rear guide plate 26. A nylon roller 42 on the stud 40 is received within the slot 34 and forms an antifriction slidable connection between the window frame and the rear guide plate.

The front guide plate 24 is considerably longer since the forward portion of the window must be moved a greater distance in order to completely house it within the body. The upper end of the front guide plate 24 is mounted upon the supporting panel 20 by means of a pair of adjustable set screws 44 received within internally threaded annular flanges 46 struck out from the upper portion of the guide plate 24. Adjustment of the set screws 44 moves the front guide plate 24 toward or away from the supporting panel 20 to provide the necessary alignment for the rear quarter window. A nut 48 clamps the set screws 44 in their adjusted positions.

The lower portion of the front guide plate 24 is likewise adjustably supported upon the supporting panel 20. As seen in Figure 4, a generally U-shaped bracket 50 is welded to the underside of the guide plate 24 and is formed with an internally threaded annular flange 52 receiving a set screw 54 to permit adjustment of the guide plate 24 toward or away from the supporting panel 20. The set screw 54 is held in adjusted position by means of a nut 56.

Suitable adjustment of the two upper set screws 44 and the lower set screw 54 regulates the position and path of the rear quarter window 10 so that proper alignment with the window opening in the vehicle body may be obtained.

The lower frame section 16 of the quarter window frame 12 is formed with an integral downwardly depending flange 58. The flange 58 is formed with a guideway 60 extending generally longitudinally thereof for engagement by the regulator equalizer arm, as described more in detail hereinafter. The flange 58 of the window frame is also formed with a lower extension 62 terminating in an arcuate rearwardly facing edge 64. As best seen in Figure 7, bearing surfaces 66 and 68 are provided on opposite sides of the flange extension 62 adjacent the lower arcuate edge 64 thereof.

A pivot stud 70 extends through the flange 58 at the center of the arcuate lower edge 64 thereof, and pivotally supports the upper end of a stabilizer arm 72. A flanged nylon guide 74 is carried upon the pivot stud 70 between the stabilizer arm 72 and the head 76 of the stud. A washer 78 and a spring washer 80 are also carried by the pivot stud 70 and are located at the opposite side of the front guide plate 24 from the flanged end of the bushing 74 to cooperate therewith in forming a slidable connection between the window frame and the front guide plate 24.

The pivot pin 70 and the guide bushing 74 carried by the downwardly depending flange 58 of the window frame pass through a slot 82 formed in the front guide track 24. A second guide pin 84 is carried at the lower end of the stabilizer arm 72 and likewise supports a guide bushing 86 and washers 88 and 90 for engagement with a portion of the guide slot 82 spaced from the guide pin 70 by the length of the stabilizer arm 72.

Adjacent its lower end the stabilizer arm 72 has riveted thereto a guide clip 92. The base 94 of the guide clip 92 is riveted to the stabilizer arm 72, and the clip is provided with a laterally offset flange 96 engageable with the bearing surface 68 adjacent the edge of the flange extension 62 of the lower window frame section 16.

From the foregoing it will be apparent that downward movement of the quarter window 10 results in a downward movement of the guide bushing 74 upon the pivot pin 70 within the slot 82 in the front guide plate 24. This is accompanied by a corresponding downward movement of the guide bushing 86 carried by the pivot pin 84 at the lower end of the stabilizer arm 72. The particular configuration of the guide slot 82 in the guide plate to accomplish the desired window movement results in certain angular movement of the stabilizer arm 72 about the pivot pin 70, but it will be seen that regardless of the angular position of the stabilizer arm 72 relative to the window frame flange extension 62 proper lateral support of the window frame will be obtained since the bearing surface 68 on the frame flange extension will remain in engagement with the offset portion 96 of the guide clip 92 carried by the stabilizer arm. The opposite bearing surface 66 of the flange extension bears against the stabilizer arm 72 so that lateral stability of the quarter window is achieved at all times during the travel of the window between its open and closed positions.

The regulator assembly 22 comprises a bracket 98 secured to the supporting panel 20. A drive pinion 100 is pivotally carried adjacent the upper portion of the bracket 98 and is arranged to be operated by an inside crank arm and handle (not shown) in the conventional manner. The drive 100 meshes with an idler gear 102 which carries a pinion gear 104 meshing with the teeth at the periphery of the regulator gear 106. The regulator gear 106 is mounted upon the regulator bracket 98 for pivotal movement about a pivot 108, and carries with it a regulator arm 110 which is secured thereto by means of rivets 112.

Adjacent its outer end the regulator arm 110 has pivotally connected thereto by means of a pivot pin 114 an equalizer arm 116. At one end the equalizer arm supports a guide roller 118 received within the equalizer arm guide channel 28 for movement in a substantially horizontal path. At its opposite end the equalizer arm 116 carries a guide roller 120 received within the guide slot 60 in the flange extension 58 of the lower window frame section 16. Operation of the regulator assembly 22 rotates the regulator arm 110 about the pivot 108 and, through the equalizer arm 116, moves the quarter window frame upwardly or downwardly as the case may be. In this connection it should be noted that the rearward end of the guide slot 60 in the window frame flange 58 is inclined upwardly to provide more effective control of the final closing movement of the window.

Figure 5:
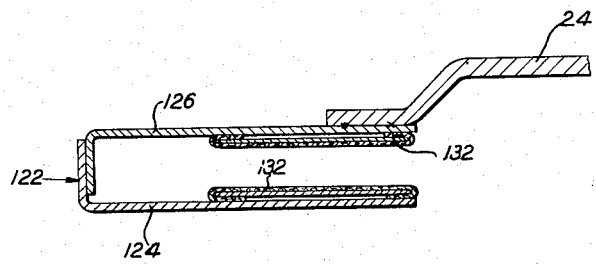
Figure 6:
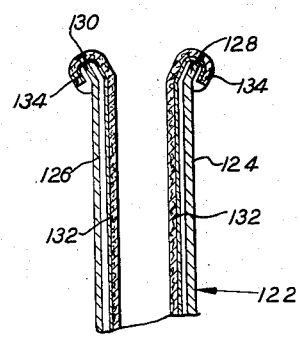

Further guiding support is afforded to the quarter window frame 12 by a guide channel 122 carried by the front guide plate 24. As best seen in Figures 1, 5 and 6, the guide channel 122 is formed of a pair of L-shaped members 124 and 126 having their short flanges welded together and with the member 124 spot welded to the edge of the front guide plate 24. As seen in Figure 6, the upper end of the guide channel 122 is open and the edges of the members 124 and 126 are flared outwardly as at 128 and 130.

Each side member 124 and 126 of the guide channel 122 is provided with a lining 132 suitably secured thereto and having its upper portion 134 crimped over the flared upper marginal edge portions 128 and 130 of the side members. The guide channel 122 and the linings 132 are so positioned and spaced as to form a guide for the forward portion of the quarter window frame 12 during a large portion of its movement between raised and lowered positions. The flared upper ends 128 and 130 of the side members insure entrance of the window frame into the channel regardless of slight misalignments.

As it will be seen from the shape of guide slot 82 in the front guide plate 24 the initial downward movement of the forward portion of the quarter window is in a gradually downwardly inclined direction, followed by a more sharply downwardly inclined movement during the intermediate portion of the travel when the guide pin 70 and the guide bushing 74 carried thereby engage the intermediate portion of the guide slot, and finally by a substantially horizontal movement during the final portion of the downward travel of the window. The initial movement of the rearward portion of the quarter window is downward as determined by the vertical portion of the guide slot 34 in the rear guide plate 26, followed by a sharply downwardly inclined intermediate movement and finally a gradual upward and rearward movement to move the quarter window into available space between the wheelhouse and other body components. During this controlled movement the window is laterally stabilized not only by the sabilizer arm 72 and the engagement of the stabilizer arm and the guide clip 92 with the lower arcuate portion of the flange extension 62 of the window frame, but also by the engagement of the forward portion of the window frame within the guide channel 122.

It will be understood that the invention is not to be limited to the exact construction shown and described, but that various changes and modifications may be made without departing from the spirit and scope of the invention, as defined in the appended claims.

What is claimed is:

1. In a window control mechanism for bodily moving a window in a motor vehicle body, a frame member extending along the lower portion of said window and supporting the latter, front and rear guide members carried by said frame member, a support, front and rear guideways on said support receiving the guide members carried by said frame member, said guideways being irregularly shaped and said front and rear guideways being shaped differently from each other to guide the movement of said window in an irregular path with the front and rear portions of said window having different movements, a stabilizer member pivotally connected to said frame member adjacent one of said guide members, a third guide member carried by said stabilizer member and received within the adjacent guideway on said support, and means on said stabilizer member engageable with a part on said window frame to laterally stabilize said window.

2. The structure defined by claim 1 which is further characterized in that said window frame has an arcuate bearing surface adjacent the stabilizer member, and the means of said stabilizer member engaging said frame comprises a clip secured to said stabilizer member and having an offset flange engaging the arcuate bearing surface on said frame to permit relative angular movement between said stabilizer member and said frame flange while affording continuous lateral stability to said window frame and window.

3. In a window control mechanism for bodily moving a window in a motor vehicle body, a window frame supporting said window, a downwardly depending flange at the forward portion of said window frame, a support, front and rear guideways on said support, said guideways being irregularly shaped and said front and rear guideways being shaped differently from each other to guide the movement of said window in an irregular path with the front and rear portions of said window having different movements, a guide member carried by said downwardly depending flange and slidably received within said front guideway, a stabilizer arm pivotally mounted upon said downwardly depending flange concentric with said guide member, a second guide member carried by said stabilizer arm and slidably received within said front guideway at a point spaced beneath first mentioned guide member, said downwardly depending flange having an arcuate bearing surface concentric with the common axis of said first guide member and said stabilizer arm, a part on said stabilizer arm having an offset portion engageable with said arcuate bearing surface to guide said flange between said offset portion and said stabilizer arm to laterally stabilize said window frame, a third guide member carried by said window frame adjacent the rearward portion thereof and slidably engageable with said rear guideway, and an actuating mechanism engageable with said window frame to raise and lower said window frame in a predetermined path as determined by said front and rear guideways.

4. The structure defined by claim 3 which is further characterized in that the downwardly depending frame flange is formed with a longitudinally extending guide slot therein, a horizontally extending guide member upon said support, a manually operable regulator gear pivotally supported upon said support, a regulator arm carried by said regulator gear, an equalizer arm pivotally connected intermediate its ends to said regulator arm, and guide means at the opposite ends of said equalizer arm engageable in the guide slots in said frame flange and said guide member respectively.

5. The structure defined by claim 3 which is further characterized in that a vertically extending U-shaped channel guide is carried by said support in a position offset downwardly and rearwardly from the forward edge of said window frame in its raised position, the upper end of the front guideway on said support being inclined downwardly and rearwardly to effect a corresponding downward and rearward movement of the forward portion of the window frame to engage the latter between the side walls of said channel guide to laterally stabilize said window frame.

6. The structure defined by claim 5 which is further characterized in that said channel guide is open along its upper rearward and lower edges and has a lining member secured to each side wall of said channel guide on the inside thereof, the upper edges of said linings being flared outwardly with respect to each other to guide said window frame therebetween.

7. The structure defined by claim 3 which is further characterized in that the guide slot in the forward frame flange of said window frame has a forward generally horizontal portion and an upwardly inclined rearward portion.

8. The structure defined by claim 3 which is further characterized in that said support comprises a fixed vertical panel and said front and rear guideways comprise elongated plates formed with guide slots therein and mounted upon said panel in spaced relation thereto, and a plurality of adjustable means supporting one of said guide plates upon said support for adjustable movement toward and away from said panel to adjust the lateral path and position of said window.

References Cited in the file of this patent

UNITED STATES PATENTS 2,298,515     Sullivan _____ Oct. 13, 1942

FOREIGN PATENTS 466,145     Great Britain _____ May 24, 1937